(12) United States Patent
Pichler et al.

(10) Patent No.: US 12,479,575 B2
(45) Date of Patent: Nov. 25, 2025

(54) INTEGRATED FRAME STRUCTURE

(71) Applicant: 4A MANUFACTURING GMBH, Traboch (AT)

(72) Inventors: Michael Pichler, Kobenz (AT); Reinhard Hafellner, Spielberg (AT)

(73) Assignee: 4A MANUFACTURING GMBH, Traboch (AT)

( * ) Notice: Subject to any disclaimer, the term of this patent is extended or adjusted under 35 U.S.C. 154(b) by 217 days.

(21) Appl. No.: 17/945,788

(22) Filed: Sep. 15, 2022

(65) Prior Publication Data

US 2023/0091923 A1 Mar. 23, 2023

(30) Foreign Application Priority Data

Sep. 17, 2021 (DE) ...................... 10 2021 124 090.5

(51) Int. Cl.
*B64C 39/02* (2023.01)

(52) U.S. Cl.
CPC .................................. *B64C 39/024* (2013.01)

(58) Field of Classification Search
CPC ...... B64C 39/024; B64U 10/00; B64U 10/80; B64U 20/00; B64U 20/98; B64U 30/00; B64U 30/10; B64U 30/16; B64U 30/20; B64U 30/299; B64U 30/30; B64U 30/40; B64U 40/00; B64U 40/20; B64U 50/00; B64U 50/39; B64U 60/00; B64U 60/70; B64U 70/00; B64U 70/99; B64U 80/00; B64U 80/86
USPC ........................................................... 701/3
See application file for complete search history.

(56) References Cited

U.S. PATENT DOCUMENTS

| | | | |
|---|---|---|---|
| 2003/0117337 A1* | 6/2003 | Lendriet | H01Q 1/246 |
| | | | 343/872 |
| 2010/0277867 A1 | 11/2010 | Chen | |
| 2011/0008566 A1 | 1/2011 | Yatsusaka et al. | |
| 2016/0216730 A1 | 7/2016 | Fumitake et al. | |
| 2019/0389174 A1 | 12/2019 | Hideaki et al. | |
| 2020/0350686 A1* | 11/2020 | Nemeth, III | H01Q 1/424 |
| 2023/0058308 A1* | 2/2023 | Rule | B32B 7/10 |

FOREIGN PATENT DOCUMENTS

| | | |
|---|---|---|
| CN | 108134198 | 6/2018 |
| CN | 110350317 | 4/2021 |
| DE | 102017215216 A1 | 2/2019 |

(Continued)

OTHER PUBLICATIONS

European Search Report dated Jan. 30, 2023 for EP 22195889.

(Continued)

*Primary Examiner* — Adam D Tissot
(74) *Attorney, Agent, or Firm* — Robert A. Blaha; Smith Tempel Blaha LLC

(57) ABSTRACT

Embodiments relate to a frame structure for a device, comprising a frame comprising a receiving opening, a core structure inserted into the receiving opening and a front layer fixed to the frame and covering a front surface of the core structure. The frame structure further comprises a back layer fixed to the frame and covering a back surface of the core structure, wherein the front layer and the back layer sandwich the core structure in such a manner that bending force acting on the core structure is absorbed by the front layer and the back layer.

20 Claims, 4 Drawing Sheets

(56) References Cited

FOREIGN PATENT DOCUMENTS

| | | |
|---|---|---|
| JP | 3572517 | 10/2004 |
| WO | 2016041954 A1 | 3/2016 |
| WO | 2016134778 A1 | 9/2016 |

OTHER PUBLICATIONS

English translation of JP 3572517 as cited in this Information Disclosure Statement.
English translation of CN 108134198 as cited in this Information Disclosure Statement.
English translation of CN 110350317 as cited in this Information Disclosure Statement.
Deutsches Patent und Markenamt; Examination Report; Jul. 15, 2022.
European Patent Office; Patent Translate; English translation of DE 10 2017 215 216 A1; Sep. 13, 2022.
El-Shaarawy, H.; Communication Pursuant to Article 94(3) EPC in Application No. 22195889.5; pp. 1-7; Sep. 10, 2024, European Patent Office, Postbus 5818, 2280 HV Rijswijk, Netherlands.

\* cited by examiner

INTEGRATED FRAME STRUCTURE

This application claims the benefit of the filing date of the German Patent Application No. 10 2021 124 090.5 filed 17 Sep. 2021, the disclosure of which is hereby incorporated herein by reference.

FIELD OF INVENTION

Embodiments of the invention relate to a frame structure for a device and a method for manufacturing a frame structure for a device. Furthermore, the invention relates to a drone for flying through the air and an electronic device comprising the frame structure.

Art Background

In many mechanical applications and robust supporting structure and housing has to be provided. However, the more robust the supporting structure is designed, the more the weight of the respective structure increases. Beside the robustness of a respective supporting structure, also further requirements have to be met for specific applications. For example, if a supporting structure is a radome for an antenna, it is necessary to provide a structure which does not reduce the transmitted antenna signals but on the other side it is necessary to provide a sufficient robustness. Furthermore, for other devices, such as aeronautic applications, for example drones, it is necessary to provide a sufficient robustness and also protection against small particles contacting the supporting structure.

For example, WO 2016/134778 A1 discloses an antenna frame structure, having a radome assembly with a radome member, a heat sink member, a seal member disposed between the radome member and the heat sink member, and a frame assembly configured to compress the seal member between the radome member and the heat sink member. The frame assembly includes a fixation member configured to be fixedly engaged with the heat sink member and an arm member, the arm member configured to engage the radome member to compress the seal member between the radome member and the heat sink member when the fixation member is engaged with the heat sink member, and wherein engagement of the fixation member with the heat sink member in a compressed state of the seal member forms a gap between the radome member and the heat sink member.

WO 2016/041954 A1 discloses a space frame radome comprising a polymeric sheet. The sheet comprises a high strength polymeric fibers and a plastomer.

However, there is a need to provide a supporting structure comprising a sufficient robustness without negatively affecting the overall weight or the function of a device.

SUMMARY OF THE INVENTION

This need may be met by a frame structure for a device and a method for manufacturing a frame structure for a device, according to the independent claims.

According to first aspect of the present invention, a frame structure for a device (for example an electronic device, such as an antenna, or an aeronautic device, such as a drone) is presented. The frame structure comprises a frame comprising a receiving opening and a core structure inserted into the receiving opening. The frame structure further comprises a front layer fixed to the frame and covering a front surface of the core structure, and a back layer fixed to the frame and covering a back surface of the core structure. The front layer and the back layer sandwich the core structure in such a manner that bending force acting on the core structure is absorbed by the front layer and the back layer.

According to further aspect, a method for manufacturing the above-described frame structure for a device is presented.

The frame is made of a robust material comprising for example metal material or plastic materials. Specifically, the frame may comprise reinforcing fibers, such as carbon fibers. The frame may be integrally formed or may be formed by a plurality of frame elements being coupled together. The frame specifically comprises and surrounds, respectively, one or a plurality of receiving openings in which a respective core structure is arranged. The frame is adapted for being coupled to further supporting elements of the device, for example to further housing parts. In other words, the frame structure is adapted for withstanding and transferring forces, such as weight forces or other forces applied to the core structure or the respective layers and thus transmitted to the frame and to device surrounding elements. The frame may comprise a platelike shape/design. Furthermore, the frame may comprise a hollow body be made for example of a hollow cuboid design.

The core structure is inserted into the receiving opening. The core structure is coupled directly to the frame or is coupled indirectly to the frame via the front layer and the back layer. Specifically, the core structure is fixed to the front layer and the back layer, such that the forces, specifically bending forces, are transmitted via the front layer and the back layer to the frame structure. The core structure functions in particular as a cover layer for covering the receiving opening, wherein the core structure may for example comprise a lower density and specifically a lower weight than the frame. For example, the core structure forms a protection against humidity, flying debris etc. At the same time, the core structure may be transparent or may shield specific radiation depending on the respective device. For example, if the device is an antenna device, the core structure may function as a radome and is transparent for the transmitted antenna signals.

The front layer and the back layer form thin layers, such as foils, which are less expendable (less stretchable) with respect to the core structure. Specifically, the Young modulus of the front layer and the back layer is higher than the Young modulus of the material of the core layer. The Young modulus, or the modulus of elasticity in tension or compression (i.e., negative tension), is a mechanical property that measures the tensile or compressive stiffness of a solid material when the force is applied lengthwise. The core structure is in general less robust than the frame structure. Hence, in order to transmit supporting forces between the core structure and the frame, the core structure is sandwiched between the front layer and the back layer. Specifically, the core structure intends to be bent upon impact of a respective forces, such that one main surface of the core structure intends to expand and the opposite main surface of the core structure intends to compress. Therefore, e.g. shearing forces act between the core structure and the front and back layer. However, the intention of the core structure upon influence of bending forces to be expanded or compressed is reduced and abandoned by the front layer and the back layer sandwiching the core structure, respectively. Specifically, the front layer and the back layer are fixed to the respective main surfaces of the core structure such that no relative movement in between along the plane of the main surfaces is possible. Therefore, the bending forces are absorbed by the non-expandable layers and further transmitted via the layers to the frame.

Specifically, although the front layer and the back layer may be deformed and compressed, the stack of the respective layers and the core structure is still not bended upon bending forces acting onto the core structure, since if the bending forces force the front layer to be compressed, the non-stretchable back layer resist against the influence of the bending forces. In other words, in each bending direction of the cost structure, one of the non-stretchable front and back layers resists against the bending and transferred the respective bending force to the frame.

Summarizing, the present invention relates to an integrated robust frame structure into which a frame is integrated. The frame functions as a structural reinforcement part. The integration of a frame provides a structural integrity needed in number of different applications where mechanically strong and lightweight part is required. As such the invention anticipates different uses by combining different material combinations from which the integrated frame structure is manufactured.

According to a further exemplary embodiment the frame comprises a protruding lip protruding into the receiving opening for providing a seat for the core structure. the protruding lip may completely surround the receiving opening or may only partially surround the receiving opening. Specifically, the core structure is placed onto the protruding lip in such a manner, that forces in an axial direction of the receiving opening may be transferred to the frame. Additionally, the core structure may be arranged within the receiving opening such that respective forces in a radial direction of the receiving opening a be transferred to the frame and in particular to sidewalls of the frame surrounding the receiving opening.

According to further exemplary embodiment, the front layer is fixed to a front surface of the frame, and/or the back layer is fixed to a back surface of the frame. the frame comprises two opposing main surfaces between which the receiving opening is formed. One main surface is the front surface and the opposing main surfaces the back surface. Hence, according to the described exemplary embodiment, the front layer and/or the back layer are fixed to the respective front or back surface.

According to further exemplary embodiment, the front layer covers the front surface and an outer side surface of the frame, wherein the front layer is in particular fixed to the outer side surface. Respectively, according to further exemplary embodiment, the back layer covers the back surface and an outer side surface of the frame, wherein the back layer is fixed to the outer side surface.

The frame comprises an inner side surface surrounding the receiving opening and an opposing outer side surface facing the environment of the frame and connecting the front surface and the back surface of the frame. Hence, the front layer may be guided from the receiving opening over the front surface further to the outer side surface of the frame. At the outer side surface respective fixing means, such as an adhesive or fixing screws, may be provided to fix the front layer to the outer side surface of the frame. Similarly, the back layer may be guided along the back surface of the frame and being fixed to the outer side surface of the frame.

According to a further exemplary embodiment, the frame comprises the inner side surface facing the receiving opening, wherein the back layer (or the front layer) covers at least partially the inner side surface. The back layer is in particular fixed to the inner side surface. Hence, it is not necessary that the respective front layer or back layer covers the front surface or the back surface of the frame and being fixed just to the inner side surface of the frame. Hence, the front surface and the back surface of the frame may be kept free of the respective layers in order to allow a proper coupling to other structural parts of the device.

According to a further exemplary embodiment the front layer and the back layer are formed integrally and surround at least partially the frame. Hence, the front layer and the back layer form a monolithically formed layer being arranged over both main surfaces of the core structure and being coupled to the frame.

According to a further exemplary embodiment, the front layer and/or the back layer are fixed by adhesive material. the adhesive may be based on a thermoplastic and/or a thermosetting material.

According to a further exemplary embodiment, the core structure, the front layer and/or the back layer are fixed by a mechanical connection, in particular a screw connection, between the frame and the core structure, the front layer and/or the back layer. For example, the mechanical connection may form a detachable mechanical connection, such as the described screw connection, such that the front layer or the back layer may be detached, for example due to maintenance reasons. Alternatively, the mechanical connection may be form of rivets. Alternatively, or additionally, the front layer and/or the back layer may be fixed to the frame by a solder connection. In a further exemplary embodiment, the mechanical connection also fixes the core structure. For example, a common through hole through the core structure, the front layer and/or the back layer and the frame may be formed (e.g. by drilling), wherein a screw is insertable into the through hole for fixing all elements, i.e. the core structure, the front layer and/or the back layer and the frame together.

According to a further exemplary embodiment, the core structure is free of a fixing connection, in particular a mechanical fixing connection. Hence, between the core structure and the frame on the one side and between the core structure and the front layer and back layer on the other side, no fixation, such as a mechanical or an adhesive connection, is provided. The core structure is only arranged in sandwiched between the front layer and the back layer within the receiving opening. If the core structure intends to bend, the bending force is nevertheless transferred to either the front layer and the back layer. Hence, the core layer is not weakened by mechanical or adhesive connections. At the same time, the robustness of the frame structure and the core structure, respectively is maintained.

According to a further exemplary embodiment, the frame structure further comprises at least one binding element, in particular an adhesive binding element, between core structure and frame. For example, the binding element may be made of a (adhesive) tape being arranged between the respective layer and the frame.

According to further exemplary embodiment, the frame comprises a coupling section for being coupled to a housing structure. The coupling section comprise for example a screw hole comprising a thread. Specifically, the coupling section may be free and uncovered of the respective front and back layers.

According to a further exemplary embodiment, the frame comprises a further receiving opening. The frame structure further comprises a further core structure inserted into the further receiving opening, a further front layer fixed to the frame and covering a front surface of the further core structure, and a further back layer fixed to the frame and covering a further back surface of the further core structure. The further front layer and the further back layer sandwich the further core structure in such a manner that bending force acting on the further core structure is absorbed by the further front layer and the further back layer. By the exemplary embodiment it is outlined, that a plurality of receiving holes including a plurality of core structures may be arranged within one common frame.

According to a further exemplary embodiment, the at least two of the front layer, the back layer, the further front layer and the further back layer are formed integrally.

According to a further exemplary embodiment, the receiving opening and the further receiving opening are formed in a common surface of the frame. For example, the receiving opening and the further receiving opening are formed in one common main surface of the frame, such as the front surface or the back surface of the frame.

According to a further exemplary embodiment, the receiving opening and the further receiving opening are formed in different surfaces of the frame. For example, the receiving opening is formed in the front surface or the back surface of the frame, is the further receiving opening is formed for example in the outer side surface of the frame.

According to a further exemplary embodiment, the frame forms a cuboid.

According to a further exemplary embodiment, the frame comprises an installation volume for housing functional elements of the device. The functional elements may comprise mechanical parts, such as gears, switches, etc., and electrical parts, such as sensors, CPUs and the like.

According to a further exemplary embodiment, the core structure is made of a foam material. The foam material may comprise pores, being open pores or closed pores.

According to a further exemplary embodiment, the core structure is made of a stack consisting of a plurality of layers. Each layer may be laminated on top of each other. For example, each layer made by the same material or being made by different materials. Hence, the physical characteristics of the core structure can be adjusted by a respective arrangement of different layers.

According to a further exemplary embodiment, the frame is made of a material comprising at least one material of the group consisting of PA-polyamide, PC-polycarbonate, PE-polyethylene, HDPE-high density polyethylene, PBT-polybutylene terephthalate, PP-polypropylene, PET-Polyethylene terephthalate, thermosets all with or without glass fibers and Liquid-crystal polymer (LCP).

According to a further exemplary embodiment, a surface of the frame comprises a roughening the surface, provided by corona or plasma surface treatments or by chemical primers. Hence, a proper connection, in particular adhesive connection, to the respective front and back layer can be provided.

According to a further exemplary embodiment, the front layer and/or the back layer is made of a material comprising at least one material of the group consisting of glass fiber reinforced thermosetting resin, thermoplastic layer, PA-polyamide, PC-polycarbonate, PE-polyethylene, HDPE-High Density Polyethylene, PP-polypropylene, PET—Polyethylene terephthalate and Liquid-crystal polymer (LCP).

The material for the frame, the material of front layer and back layer and the structure may be selected on the basis of its thermal expansion. Matching of the thermal expansion is beneficial to retain imperviousness to outside elements as warping, delamination or separation may occur if used materials have different tendencies to change its shape, area, volume and density to a change in temperature.

According to a further exemplary embodiment, the front layer and/or the back layer comprise a relative permeability of the skin layer between $2\mu$ and $5\mu$. The dielectric loss factor of the front layer and/or the back layer may be less than 0.01 while the thickness is between 0.03 mm to 0.5 mm, in particular 0.08 mm to 0.25 mm. An area density of the front layer and/or back layer may be lower than 600 kg/$^3$. The front layer and/or back layer may comprise a fiber content between 30 wt %-60 wt %.

According to a further exemplary embodiment, the frame structure further comprises a coating layer for at least partially covering the frame, the front layer or the back layer. The coating layer may be at least one of a non-conductive layer, an UV protection layer or a water imperviousness layer.

According to a further aspect of the present invention, a drone for flying through the air comprising a housing structure is provided. The housing structure is made at least partially by the above-described frame structure. The housing structure forms at least partially a respective wall element of the drone. Hence, a robust and at the same time a lightweight supporting structure for the drone can be provided.

According to a further aspect of the present invention, an electronic device comprising a housing structure is provided. The housing structure is made at least partially by the above-described frame structure. The housing structure forms at least partially a respective wall element of the electronic device. Hence, a robust and at the same time a lightweight supporting structure for the electronic device can be provided.

According to an exemplary embodiment of the electronic device, the electronic device comprises an antenna element installed in the housing structure, wherein the frame structure functions as a radome. Hence, a sufficient support and protection for the antenna element can be provided by the frame and the core structure and at the same time antenna signals can be transmitted through the core structure, since the core structure may be selected of non-absorbing material for antenna signals. Hence, the integrated frame structure is used as radome. A radome is a dome for a radar or antenna in general, with the function to protect the electric circuitry and mechanical components of the antenna from external influences such as weather, flying debris etc. Radome needs to be highly electromagnetically transparent, as its function is to protect the antenna assembly without causing redundant loss of either transmitted or received signal. In addition, a sealing between the radome and the antenna assembly is also an important aspect which is solved by this invention.

The frame structure may also be used for a lightweight lid for closing a respective container which houses for example respective electronic devices.

Further embodiments of the integrated frame structure may be used as a component in lightweight applications, for example light vehicles such as drones or containers which are transported by a drone. In this case, core structure material functions as a lightweight stiffed filling between the frame, which may also be modified to the requirements of the application. In this case, frame may be adapted to connect with further integrated frame structures in order to construct a required shape or assembly. For example, integrated frame structure could be used for walls of the multi-sided container.

Moreover, all afore mentioned embodiments may be combined. The integrated frame structure may comprise more than one receiving openings. Those receiving openings may have different functions, some may serve as radomes for communications and the others may be just lightweight fillings in order to increase the robustness.

In addition, all afore mentioned embodiments may further coated or painted with by thin non-conductive layer. Additional layer may bring additional UV protection and water imperviousness or aesthetical characteristic to the integrated frame structure.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION OF EXEMPLARY EMBODIMENTS

Figure 1:
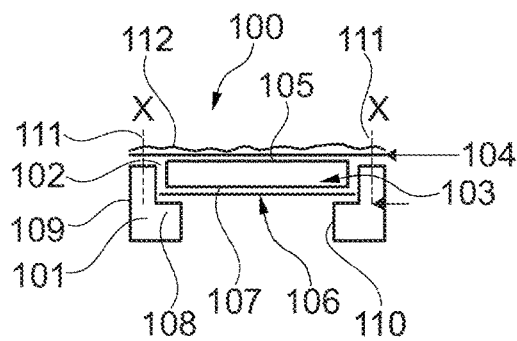
FIG. 1 to FIG. 10 illustrate different designs of the frame structure according to exemplary embodiments of the present invention.

The illustrations in the drawings are schematic. It is noted that in different figures similar or identical elements are provided with the same reference signs.

FIG. 1 to FIG. 10 show different designs of the frame structure 100 for a device according to exemplary embodiments of the present invention. The frame structure 100 comprises a frame 101 with a receiving opening 102, a core structure 103 inserted into the receiving opening 102 and a front layer 104 fixed to the frame 101 and covering a front surface 105 of the core structure 103. The frame structure 100 further comprises a back layer 106 fixed to the frame 101 and covering a back surface 107 of the core structure 103, wherein the front layer 104 and the back layer 106 sandwich the core structure 103 in such a manner that bending force acting on the core structure 103 is absorbed by the front layer 104 and the back layer 106.

The frame 101 is made of a robust material comprising for example metal material or plastic materials. Specifically, the frame 101 may comprise reinforcing fibers, such as carbon fibers. The frame 101 may be integrally formed or may be formed by a plurality of frame elements being coupled together.

The frame 101 comprises and surrounds, respectively, one or a plurality of receiving openings 102 in which a respective core structure 103 is arranged. The frame 101 is adapted for being coupled to further supporting elements of the device, for example to further housing parts.

The core structure 103 is inserted into the receiving opening 102. The core structure 103 as shown in the exemplary embodiments is coupled indirectly to the frame 101 via the front layer 104 and the back layer 106. Specifically, the core structure 103 is fixed to the front layer 104 and the back layer 106, such that the forces, specifically bending forces, are transmitted via the front layer 104 and the back layer 106 to the frame 101. The core structure 103 functions in particular as a cover layer for covering the receiving opening 102.

The front layer 104 and the back layer 106 form thin layers, such as foils, which are less expendable (less stretchable) with respect to the core structure 103. In order to transmit supporting forces between the core structure 103 and the frame 101, the core structure 103 is sandwiched between the front layer 104 and the back layer 106. Specifically, the core structure 103 intends to be bent upon impact of a respective forces, such that one main surface of the core structure 103 intends to expand and the opposite main surface of the core structure intends to compress. However, the non-stretchable layers 104, 106 receive the bending forces such that a bending motion of the core structure 103 is damped.

The frame 101 comprises a protruding lip 108 protruding into the receiving opening 101 for providing a seat for the core structure 103. The protruding lip 108 may completely surround the receiving opening 102 or may only partially surround the receiving opening 102. Specifically, the core structure 103 is placed onto the protruding lip 108 in such a manner, that forces in an axial direction of the receiving opening 102 may be transferred to the frame 101.

As shown in FIG. 1., the front layer 104 may be fixed to a front surface of the frame 101. The frame 101 comprises two opposing main surfaces between which the receiving opening 102 is formed. One main surface is the front surface and the opposing main surfaces the back surface. The back layer 106 is arranged between a top surface of the protruding lip 108 which faces the core structure 103. In other words, the back layer 106 is sandwiched by the core structure 103 and the top surface of the protruding the 108.

The front layer 104 and/or the back layer 106 are fixed by adhesive material. The adhesive may be based on a thermoplastic and/or a thermosetting material.

As can be taken from FIG. 1, the front layer may be fixed by a mechanical connection 111, in particular a screw connection, between the frame 101 and the respective layer 104. For example, the mechanical connection 111 may form a detachable mechanical connection, such as the described screw connection, such that the front layer 104 or the back layer 106 may be detached. The core structure 103 may be free of a fixing connection, in particular a mechanical fixing connection.

The frame 101 may comprise a coupling section for being coupled to a housing structure (not shown). The coupling section comprise for example a screw hole comprising a thread. Specifically, the coupling section may be free and uncovered of the respective front and back layers (for example the outer side surface 109 in FIG. 1).

The frame 101 further comprises a coating layer 112 for at least partially covering the frame 101, the front layer 104 or the back layer 106. The coating layer may be at least one of a non-conductive layer, an UV protection layer or a water imperviousness layer.

Figure 2:
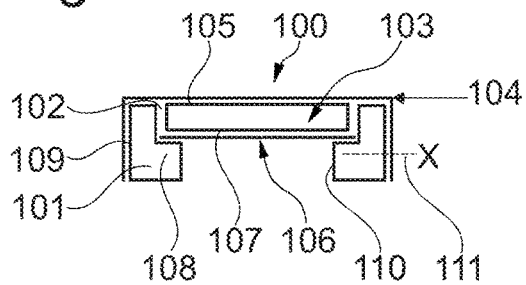

In the exemplary embodiment shown in FIG. 2, the front layer 104 covers the front surface and an outer side surface 109 of the frame 101, wherein the front layer 104 is in particular fixed to the outer side surface 109. The frame 101 comprises an inner side surface 110 surrounding the receiving opening 102 and an opposing outer side surface 109 facing the environment of the frame 101 and connecting the front surface and the back surface of the frame 101. Hence, the front layer 104 may be guided from the receiving opening 102 over the front surface further to the outer side surface 109 of the frame. At the outer side surface 109 respective fixing means 111, such as an adhesive or fixing screws, may be provided to fix the front layer 104 to the outer side surface 109 of the frame. The back layer 106 is arranged between a top surface of the protruding lip 108 which faces the core structure 103. In other words, the back layer 106 is sandwiched by the core structure 103 and the top surface of the protruding the 108.

Figure 3:
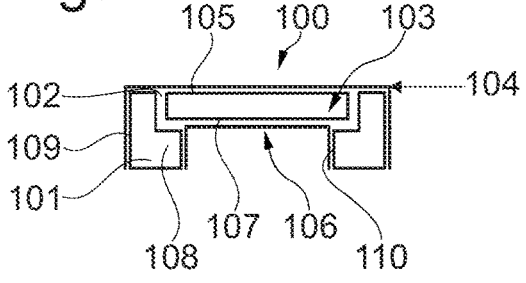

As can be taken from FIG. 3, the frame comprises the inner side surface 110 facing the receiving opening 102, wherein the back layer 106 covers at least partially the inner side surface 110. The back layer 106 is in particular fixed to the inner side surface 110. Hence, it is not necessary that the respective front layer 104 or back layer 106 covers the front surface or the back surface of the frame 101 and being fixed just to the inner side surface 110 of the frame 101. Hence, the front surface and the back surface of the frame 101 may be kept free of the respective layers in order to allow a proper coupling to other structural parts of the device. Specifically, the back layer 106 covers the back surface 107 of the core structure 103 and partially further the inner side surface 110 of the frame 101. The back layer 106 may be fixed to the inner side surface 110 of the frame 101.

Figure 4:
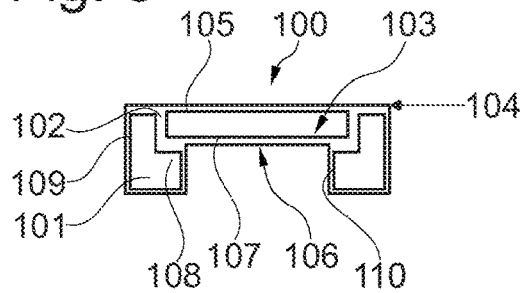

As can be taken from FIG. 4, the front layer 104 is guided on top of the front surface 105 of the core structure 103, further over the front surface of the frame 101, further over the outer side surface 109 of the frame 101 and further over the back surface of the frame 101. The back layer 106 covers the back surface 107 of the core structure 103 and partially further the inner side surface 110 of the frame 101. The back layer 106 may be fixed to the inner side surface 110 of the frame 101.

The front layer 104 and the back layer 106 may be structurally separated. Additionally, the front layer 104 and the back layer 106 may be fixed together by an adhesive or by soldering. For example, the front layer 104 and the back layer 106 are formed integrally. Hence, the front layer 104 and the back layer 106 form a monolithically formed layer being arranged over both main surfaces 105, 107 of the core structure 103 and being coupled to the frame 101.

Figure 5:
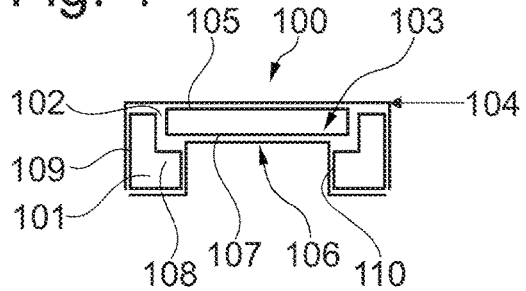

As can be taken from FIG. 5, the front layer 104 is guided on top of the front surface 105 of the core structure 103, further over the front surface of the frame 101 and further over the outer side surface 109 of the frame 101. The back layer 106 covers the back surface 107 of the core structure 103 and partially further the inner side surface 110 of the frame 101 and further the back surface of the frame 101. The back layer 106 may be fixed to the inner side surface 110 of the frame 101 and/or the back surface of the frame 101.

Figure 6:
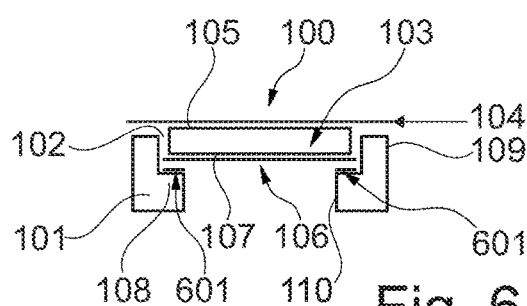

As can be taken from FIG. 6, the front layer 104 covers the front surface 105 of the core structure 103 and the front surface of the frame 101. The back layer 106 is arranged between the protruding lip 108 and the core structure 103. At least one binding element 601, in particular an adhesive binding element, is arranged between the back layer 106 and the top surface of the protruding lip 108. In other words, between the core structure 103 and the top surface of the protruding lip 108, the back layer 106 and the binding element 601 is arranged. The binding element 601 fixes the back layer 106 to the frame 101 for example by adhesion.

Figure 7:
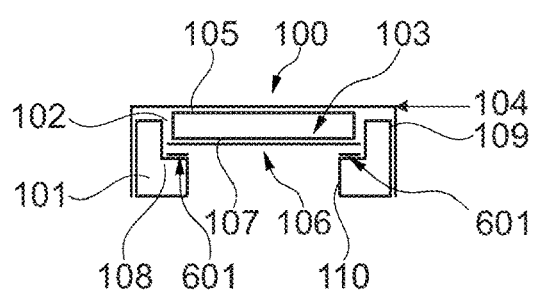

As can be taken from FIG. 7, the front layer 104 covers the front surface 105 of the core structure 103, the front surface of the frame 101 and an outer side surface 109 of the frame 101. The back layer 106 is arranged between the protruding lip 108 and the core structure 103. At least one binding element 601, in particular an adhesive binding element, is arranged between the back layer 106 and the top surface of the protruding lip 108.

Figure 8:
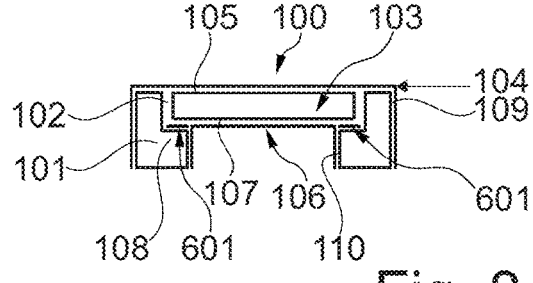

As can be taken from FIG. 8, the front layer 104 covers the front surface 105 of the core structure 103, the front surface of the frame 101 and an outer side surface 109 of the frame 101. The back layer 106 covers the back surface 107 of the core structure 103 and at least partially the inner side surface 110. The back layer 106 is in particular fixed to the inner side surface 110. At least one binding element 601, in particular an adhesive binding element, is arranged between the back surface 107 of the core structure 103 and the top surface of the protruding lip 108. Hence, the binding element 601 may fix for example by adhesion the core structure 103 to the top surface of the protruding lip 108.

Figure 9:
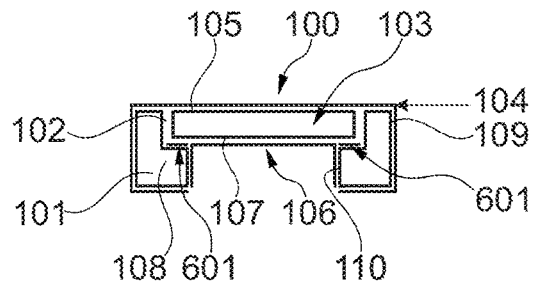

As can be taken from FIG. 9, the front layer 104 is guided on top of the front surface 105 of the core structure 103, further over the front surface of the frame 101, further over the outer side surface 109 of the frame 101 and further over the back surface of the frame 101. The back layer 106 covers the back surface 107 of the core structure 103 and partially further the inner side surface 110 of the frame 101. The back layer 106 may be fixed to the inner side surface 110 of the frame 101. At least one binding element 601, in particular an adhesive binding element, is arranged between the back surface 107 of the core structure 103 and the top surface of the protruding lip 108. Hence, the binding element 601 may fix for example by adhesion the core structure 103 to the top surface of the protruding lip 108.

Figure 10:
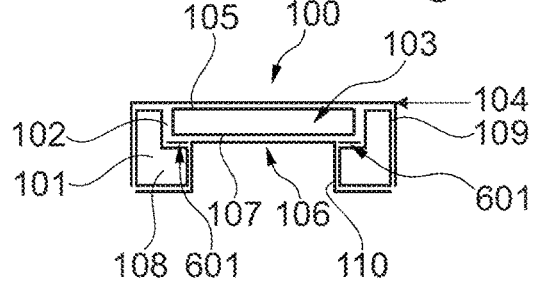

As can be taken from FIG. 10, the front layer 104 is guided on top of the front surface 105 of the core structure 103, further over the front surface of the frame 101 and further over the outer side surface 109 of the frame 101. The back layer 106 covers the back surface 107 of the core structure 103 and partially further the inner side surface 110 of the frame 101 and further the back surface of the frame 101. The back layer 106 may be fixed to the inner side surface 110 of the frame 101 and/or the back surface of the frame 101. At least one binding element 601, in particular an adhesive binding element, is arranged between the back surface 107 of the core structure 103 and the top surface of the protruding lip 108. Hence, the binding element 601 may fix for example by adhesion the core structure 103 to the top surface of the protruding lip 108.

Figure 11:
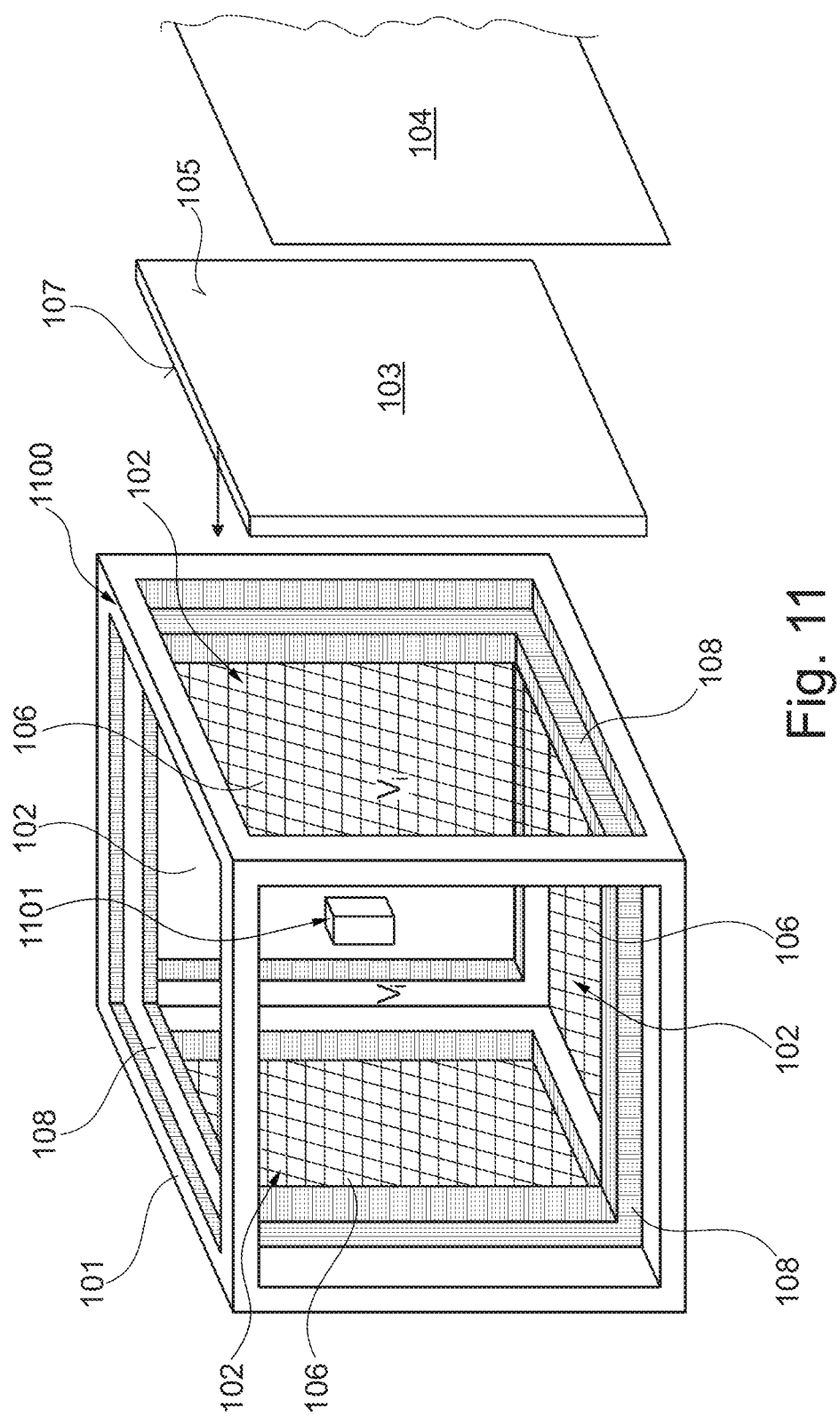
FIG. 11 illustrates a schematic view of a frame structure forming a cuboid shape according to an exemplary embodiment of the present invention.

FIG. 11 illustrates a schematic view of a frame structure 100 forming a cuboid shape according to an exemplary embodiment of the present invention. Specifically, a housing structure for an electronic device is provided.

The frame 101 comprises a 3-dimensional framework surrounding an installation volume Vi in which respective functional elements 1101 may be installed. The functional elements 1101 may comprise mechanical parts, such as gears, switches, etc., and electrical parts, such as sensors, CPUs and the like.

The frame 100 may be monolithically formed in one piece or may be formed by a plurality of frame beams that are fixed together. Generally spoken, the frame 100 comprises further receiving openings 102. The frame structure 100 further comprises respective further core structures 103 inserted into the further receiving openings 102, respective further front layers 104 fixed to the frame 100 and covering the respective front surfaces 105 of the respective further core structures 103, and respective further back layers 106 fixed to the frame 101 and covering respective further back surfaces 107 of the respective further core structures 103. Hence, a plurality of receiving holes 102 including a plurality of core structures 103 may be arranged within one common frame 101.

Specifically, as can be taken from the exemplary embodiment in FIG. 1, the receiving openings 102 are formed in different surfaces surrounded by the cuboid shaped frame 101.

According to a further aspect of the present invention, an electronic device comprising a housing structure is provided. The housing structure is made at least partially by the above-described frame structure. The housing structure forms at least partially a respective wall element of the electronic device. Hence, a robust and at the same time a lightweight supporting structure for the electronic device can be provided.

In an exemplary embodiment, the electronic device 1101 comprises an antenna element as functional element 1101 installed in the housing structure, wherein the frame structure 100 functions as a radome. Hence, a sufficient support and protection for the antenna element can be provided by the frame 101 and the core structures 103 and at the same time antenna signals can be transmitted through the core structures 103, since the core structures 103 may be selected of non-absorbing material for antenna signals.

Figure 12:
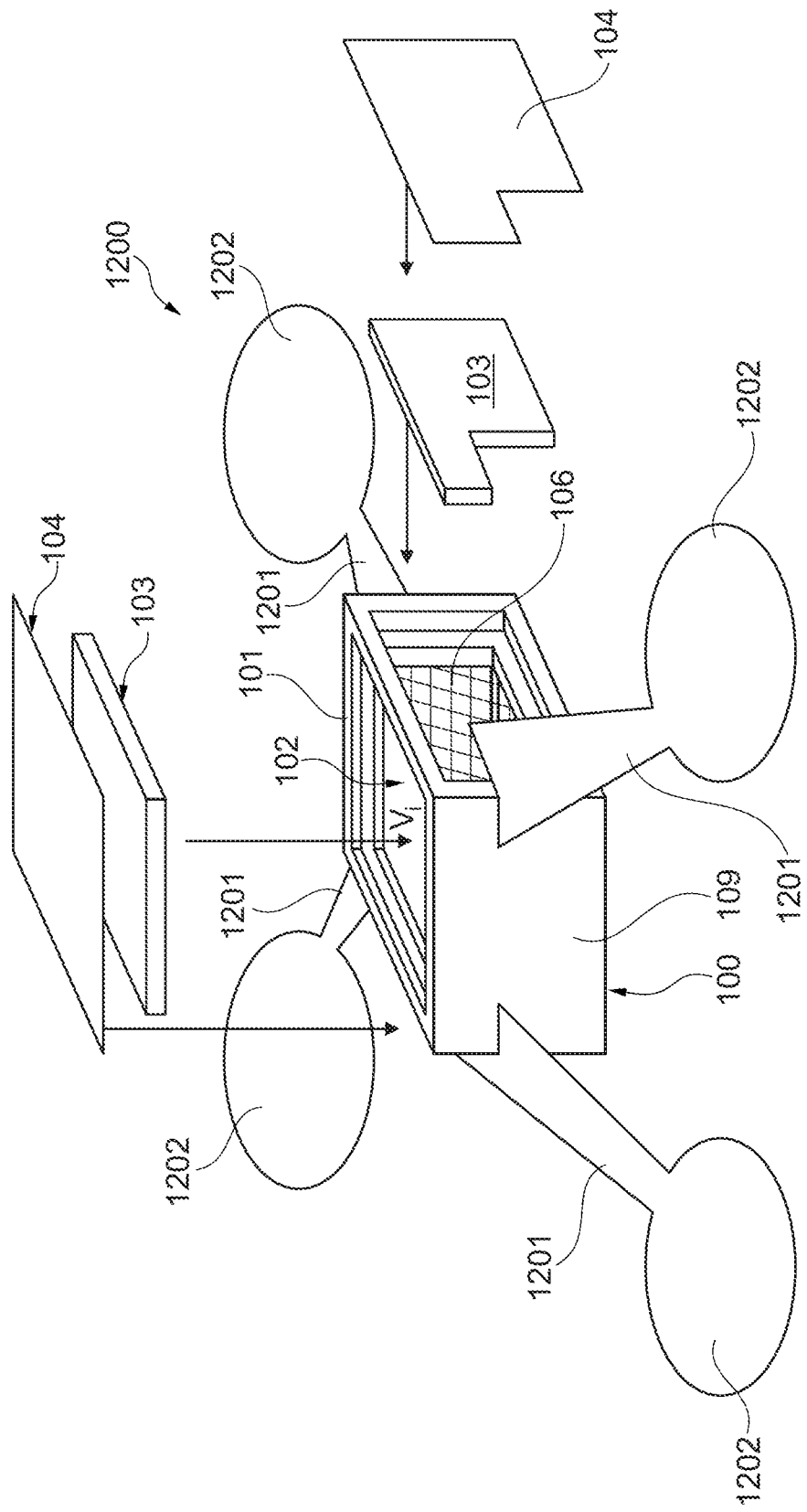
FIG. 12 illustrates a schematic view of a drone comprising the frame structure according to an exemplary embodiment of the present invention.

FIG. 12 illustrates a schematic view of a drone 1200 comprising the frame structure 100. The drone 1200 is configured for flying through the air comprising a housing structure made of the frame structure 100. The housing structure forms at least partially a respective wall element of the drone 1200. The frame structure 100 comprises a frame 101 with receiving openings 102, core structures 103 inserted into the respective receiving openings 102. Front layers 104 are fixed to the frame 101 and cover respective front surfaces 105 of the respective core structures 103. The frame structure 100 further comprises respective back layers 106 fixed to the frame 101 and covering respective back surfaces 107 of the respective core structures 103. Each front layer 104 and back layer 106 sandwich at least one core structure 103 in such a manner that bending force acting on the core structure 103 is absorbed by the respective front layer 104 and the back layer 106. Hence, a robust and at the same time a lightweight supporting structure for the drone 1200 can be provided.

Additionally, to the outer side of the frame structure 100, further fittings 1201, such as supporting beams or other coupling elements, can be attached and protrude from the outer side surface 109 of the frame 101. For example, the fittings 1201 form a supporting beams for coupling respective motor devices 1202 for the drone 1200. Hence, a robust and at the same time a lightweight supporting structure for the drone 1200 can be provided.

Figure 13:
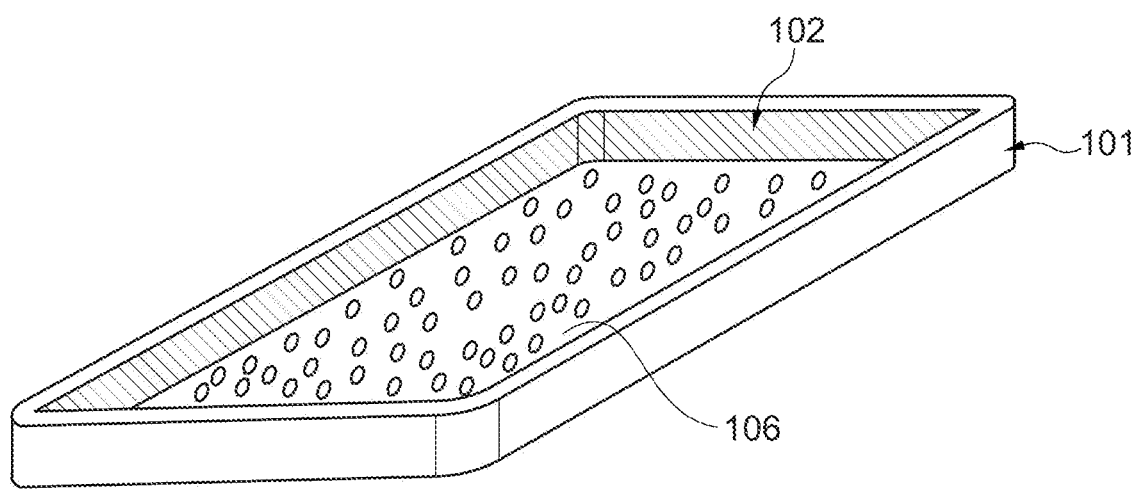
FIG. 13 illustrates a further design of a frame without a protruding lip according to an exemplary embodiment of the present invention.

FIG. 13 illustrates a further design of a frame 101 without a protruding lip according to an exemplary embodiment of the present invention. For the better overview, in FIG. 13 the front layer 104 and the core structure are not shown but are implemented in the present embodiment.

The frame structure 100 comprises the frame 101 with a receiving opening 102. A core structure 103 (not shown) is inserted into the receiving opening 102 and a front layer 104 (not shown) is fixed to the frame 101 and covering a front surface 105 (not shown) of the core structure 103. The frame structure 100 further comprises a back layer 106 fixed to the frame 101 and covering a back surface 107 (not shown) of the core structure 103, wherein the front layer 104 and the back layer 106 sandwich the core structure 103 in such a manner that bending force acting on the core structure 103 is absorbed by the front layer 104 and the back layer 106. The frame 101 may be integrally formed.

In the embodiment, the inner surface of the frame is free of the protruding lip and comprises a homogenous flat surface, respectively. The core structure 103 may be glued or fixed by a mechanical coupling (e.g. screw connection) to the inner surface of the frame.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 frame structure
101 frame
102 receiving opening
103 core structure
104 front layer
105 front surface
106 back layer
107 back surface
108 protruding lip
109 outer side
110 inner side
111 mechanical connection
112 coating layer
601 binding element
1100 electronic device
1101 functional element
1200 drone
1201 fitting
1202 motor

The invention claimed is:

1. A frame structure for a device, the frame structure comprising:
    a frame defining a receiving opening,
    a core structure in the receiving opening,
    a front layer fixed to the frame and covering a front surface of the core structure, and
    a back layer fixed to the frame and partially covering a back surface of the core structure,
    wherein the front layer and the back layer sandwich the core structure in such a manner that a bending force acting on the core structure is absorbed by the front layer and the back layer,
    wherein the front layer is fixed to a front surface of the frame,
    wherein the frame comprises a protruding lip protruding into the receiving opening, the protruding lip providing a seat for the core structure,
    wherein the back layer covers opposed surfaces of the frame adjacent to the seat,
    wherein the front layer covers at least partially the front surface of the core structure and outward facing surfaces of the frame.

2. The frame structure according to claim 1,
wherein the front layer and the back layer are formed monolithically.

3. The frame structure according to claim 1,
wherein the back layer is fixed to an opposed surface of the frame.

4. The frame structure according to claim 1, further comprising:
a binding element arranged between the back surface of the core structure and the protruding lip.

5. The frame structure according to claim 1,
wherein the back layer covers an outer side surface of the frame,
wherein the back layer is fixed to the outer side surface.

6. The frame structure according to claim 1,
wherein the back layer is fixed to the opposed surfaces of the frame.

7. The frame structure according to claim 1,
wherein the front layer and the back layer are formed integrally and surround at least partially the frame.

8. The frame structure according to claim 1,
wherein the front layer and/or the back layer are fixed by an adhesive material.

9. The frame structure according to claim 1,
wherein the core structure, the front layer and/or the back layer are fixed by a mechanical connection to the frame.

10. The frame structure according to claim 1, further comprising:
at least one binding element between the core structure and the frame.

11. The frame structure according to claim 1,
wherein the frame comprises a coupling section.

12. The frame structure according to claim 1, further comprising:
a further receiving opening,
a further core structure inserted into the further receiving opening,
a further front layer fixed to the frame and covering a front surface of the further core structure,
a further back layer fixed to the frame and covering a further back surface of the further core structure,
wherein the further front layer and the further back layer sandwich the further core structure in such a manner that a bending force acting on the further core structure is absorbed by the further front layer and the further back layer,
wherein at least two of the front layer, the back layer, the further front layer and the further back layer are formed integrally,
wherein the receiving opening and the further receiving opening are formed in one of a common surface of the frame or different surfaces of the frame.

13. The frame structure according to claim 12,
wherein the frame structure is a component of a housing.

14. The frame structure according to claim 1,
wherein the frame structure forms a cuboid,
wherein the frame structure comprises in particular an installation volume for housing functional elements.

15. The frame structure according to claim 1,
wherein the core structure is made of a foam material, or
wherein the core structure is made of a stack consisting of a plurality of layers.

16. The frame structure according to claim 1,
wherein the frame is made of a material comprising at least one material of the group consisting of PA-polyamide, PC-polycarbonate, PE-polyethylene, HDPE-high density polyethylene, PBT-polybutylene terephthalate, PP-polypropylene, PET-Polyethylene terephthalate, thermosets all with or without glass fibers and Liquid-crystal polymer (LCP),
wherein a surface of the frame is roughened by corona or plasma surface treatments or by chemical primers.

17. The frame structure according to claim 1, further comprising at least one of the following features:
wherein the front layer and/or the back layer is made of a material comprising at least one material of the group consisting of glass fiber reinforced thermosetting resin, thermoplastic layer, PA-polyamide, PC-polycarbonate, PE-polyethylene, HDPE-High Density Polyethylene, PP-polypropylene, PET-polyethylene terephthalate and Liquid-crystal polymer (LCP),
wherein the front layer and/or the back layer comprise a relative permeability of the skin layer between 2 p and 5 p,
wherein a dielectric loss factor is less than 0.01 while the thickness is between 0.03 mm to 0.5 mm, and/or wherein an area density of the front layer and/or back layer is lower than 600 kg/m$^3$,
wherein the front layer and/or back layer comprises a fiber content between 30 wt %-60 wt %,
a coating layer for at least partially covering the frame, the front layer or the back layer, wherein the coating layer is at least one of a non-conductive layer, an UV protection layer or a water imperviousness layer.

18. The frame structure of claim 1,
wherein the core structure is transparent to radio-frequency signals.

19. The frame structure according to claim 18,
wherein the frame structure is a component of a housing,
wherein the housing forms at least partially a wall of an electronic device,
wherein the frame structure functions as a radome.

20. A method for manufacturing a frame structure for a device, the method comprising:
providing a frame defining a receiving opening, the frame including a protruding lip protruding into the receiving opening, the protruding lip providing a seat,
inserting a core structure into the receiving opening,
fixing a front layer to a front surface of the frame and covering at least partially a front surface of the core structure and outward facing surfaces of the frame, and
fixing a back layer to the frame and covering at least partially a back surface of the core structure, the back layer covering opposed inner surfaces of the frame,
wherein the front layer and the back layer sandwich the core structure in such a manner that a bending force acting on the core structure is absorbed by the front layer and the back layer.

* * * * *